Figure 1:
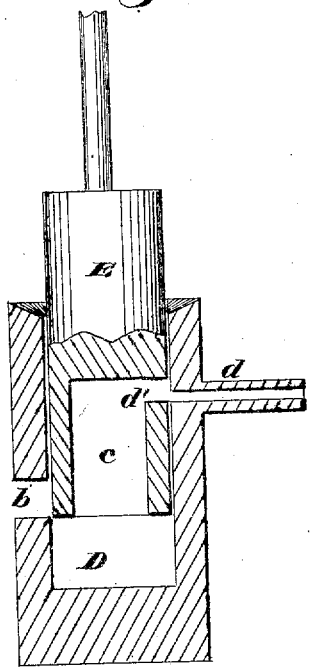

J. A. T. OVEREND.

Type-Casting Machine.

No. 6,506.

Reissued June 22, 1875.

Witnesses

Geo. H. Strong.

Jno. L. Boone

Inventor

John A. T. Overend by Dewey & Co

Attys

UNITED STATES PATENT OFFICE.

JOHN A. T. OVEREND, OF SAN FRANCISCO, CALIFORNIA.

IMPROVEMENT IN TYPE-CASTING MACHINES.

Specification forming part of Letters Patent No. 136,091, dated February 18, 1873; reissue No. 6,506, dated June 22, 1875; application filed May 13, 1875.

DIVISION B.

*To all whom it may concern:*

Be it known that I, JOHN ALFRED THOMAS OVEREND, of the city and county of San Francisco, State of California, have invented an Improvement in Pumps for Type-Casting and other Machines; and I do hereby declare the following description and accompanying drawing are sufficient to enable any person skilled in the art or science to which it most nearly appertains to make and use my said invention without further invention or experiment.

The object of my invention is to provide an improved pump for forcing melted metals into type-casting machines and other similar uses.

Referring to the accompanying drawings for a more complete explanation of my invention, Figure 1 is a vertical section of my pump in elevation.

D is the pump-cylinder, within which the plunger E works. This plunger is made with a chamber, C, in its lower end. In order to admit the liquid, I have shown a slot or hole, *b*, at the lower part of the cylinder, and the bottom of the piston rises above this opening at each stroke, so as to allow the liquid to flow in by gravity. As the piston descends this passage will be cut off, and an opening, *d'*, in the upper part of the chamber *c*, arrives at a point opposite to the discharge-opening *d*, so that a farther descent of the piston will cause the liquid to be ejected forcibly through the discharge-opening.

Having thus described my invention, what I claim, and desire to secure by Letters Patent, is—

The pump-cylinder D, provided with an opening to admit the liquid to the pump without the use of valves, in combination with the piston E, chambered as shown, substantially as herein described.

J. A. T. OVEREND.

Witnesses:

JNO. L. BOONE,

A. H. EVANS.